March 31, 1936.  S. WHEATLEY ET AL  2,036,007
VACUUM PRODUCING DEVICE
Filed Aug. 27, 1934
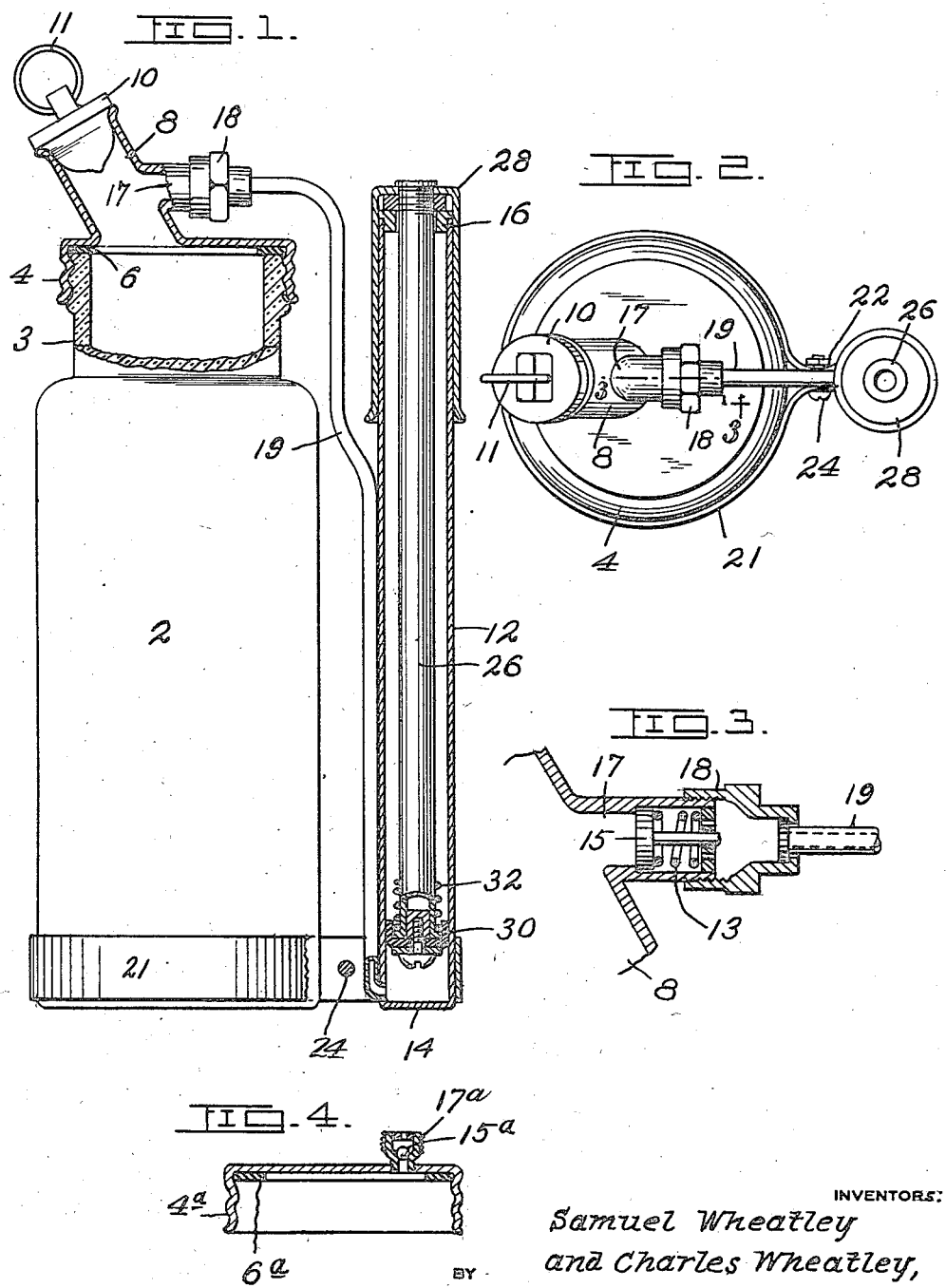
INVENTORS:
Samuel Wheatley
and Charles Wheatley,
F. G. Fischer,
ATTORNEY.

Patented Mar. 31, 1936

2,036,007

UNITED STATES PATENT OFFICE 2,036,007

VACUUM PRODUCING DEVICE

Samuel Wheatley and Charles Wheatley, Kansas City, Mo.

Application August 27, 1934, Serial No. 741,684

1 Claim. (Cl. 99—8)

Our invention relates to vacuum producing devices and our object is to provide a simple and inexpensive device of this character which may be either permanently or detachably connected to food containers of various kinds for the purpose of exhausting the air therefrom in order to prevent deterioration of the food.

It is common knowledge that the presence of air has a deteriorating effect on foods placed in containers for preservation and such deteriorating is hastened if it is necessary to open a container each day for removal of a portion of the contents.

For instance, experiments have determined that after roasting, coffee beans or ground coffee loses its freshness in a short time when exposed to the air. Even when stored in an air tight container the small amount of air present destroyed the flavor of the coffee to a great extent in eight or nine days, although the lid of the container was not opened during that period.

By the use of our device the air can be exhausted from the container just as soon as the latter is filled and as often as any of the contents are removed, so that said contents can be kept in good condition until all is used.

In order that the invention may be fully understood, reference will now be had to the accompanying drawing, in which:

Fig. 1 is a side elevation, partly in section, of a container with our vacuum producing device attached thereto.

Fig. 2 is a plan view of the parts disclosed by Fig. 1.

Fig. 3 is an enlarged broken sectional view on line 3—3 of Fig. 2.

Fig. 4 is a cross section of a container lid provided with a modified form of check-valve.

Referring in detail to the different parts, 2 designates a container shown in the present instance in the form of a glass jar, although it may be made of tin or other suitable material. The open neck 3 of the container 2 is adapted to be closed by a lid 4 which may be removable as shown, or permanently attached to the container, as preferred. In the present instance the lid 4 is shown removable from the neck 3 and equipped with a gasket 6 to form an air tight joint between the upper edge of said neck 3 and the lid.

If part of the contents of the container 2 are to be removed from time to time I prefer to provide said container with means whereby it may be filled and the contents removed without taking off the lid 4. In the present instance I have shown such means in the form of a nozzle 8 projecting from the lid 4 and adapted to be closed with a stopper 10 or other air tight closure equipped with a handle such, for instance, as a ring 11.

Suitable means for exhausting the air from the container to form a vacuum therein is employed. In the present instance said means comprises a manually operated suction pump consisting of a cylinder 12, an air tube 19, and a piston 26. The cylinder 12 is closed at its lower end and provided at its upper end with a bushing 16 which acts as a guide for the piston 26 and also prevents accidental withdrawal of the same from said cylinder. The upper end of the piston 26 is provided with a handle 28 of tubular form to afford a convenient grip for the operator and also to move down over the cylinder 12 and thus occupy but little space when at rest. The cylinder 12 forms a convenient handle whereby the device may be carried.

The head of the piston 26 is provided with a flexible cup or gasket 30 which expands on the upward stroke and thus exhausts the air from the container 2 and contracts on the downward stroke and permits the air trapped in the tube 19 by a check-valve 15 to escape through the upper end of the cylinder 12. The lower portion of the piston 26 is provided with cushioning means 32 in the form of a coil spring adapted to contact the bushing 16 on the upward stroke of the piston and thus prevent the shock which would otherwise occur if the piston head contacted the bushing 16.

The check-valve 15 operates in a tubular extension 17 projecting laterally from the nozzle 8 and connected to the upper end of the air tube 19 by means of a coupling 18. The check-valve 15 is yieldably held to its seat by a coiled spring 13. The lower portion of the cylinder 12 is detachably connected to the container 2 by a flexible band 21 which is drawn taut by means of a bolt 24 and a nut 22.

In practice, when it is desired to fill the container 2 the stopper 10 is removed, so that coffee or other food may be poured through the nozzle 8. After the container 2 has been filled the stopper 10 is replaced and the piston 26 is operated to exhaust the air from the container. After the desired vacuum has been produced entrance of air into the container 2 is prevented by the stopper 10 and the check-valve 15, which latter is not only held in closed position by means of the spring 18, but also by suction created by the vacuum. When it is desired to remove some of the contents from the container 2 this may be readily accomplished by removing the stopper 10 and inclining the container 2 until the contents thereof run out through the nozzle 8.

If some of the contents are to be used each day our vacuum producing device is preferably left permanently connected to the container 2 so that the air can be exhausted therefrom each time some of the contents are removed, but if a large number of containers are to be filled with food for storage one vacuum producing device may be employed for exhausting the air from all of said containers and thereby save the cost of permanently equipping each container with one of the devices. In the latter instance the lid 4a, Fig. 4, is preferably employed and the nozzle 8 and the stopper 10 are dispensed with. As shown the lid 4a is provided with a tubular shell 17a which occupies but little space and encloses the check-valve 15a. The shell 17a is threaded for the reception of the threaded coupling 18 on the upper end of the air tube 19.

From the foregoing description it is apparent that we have provided vacuum producing means possessing the advantages above pointed out, and while we have shown certain forms of such means we reserve all rights to such other forms and modifications thereof as properly fall within the spirit and scope of the invention as claimed.

Having thus described our invention, what we claim and desire to secure by Letters Patent, is:

In combination, a container having a nozzle through which it may be filled or emptied, an air-tight closure for said nozzle, a tubular extension projecting from said nozzle, vacuum producing means connected to said tubular extension, and a check-valve in said tubular extension for cooperating with the nozzle closure in maintaining a vacuum within the container.

SAMUEL WHEATLEY.
CHARLES WHEATLEY.